Dec. 22, 1964 F. M. YAX 3,162,809
ANTENNA TUNER CIRCUIT FOR RADIO TRANSCEIVER
Filed July 25, 1962
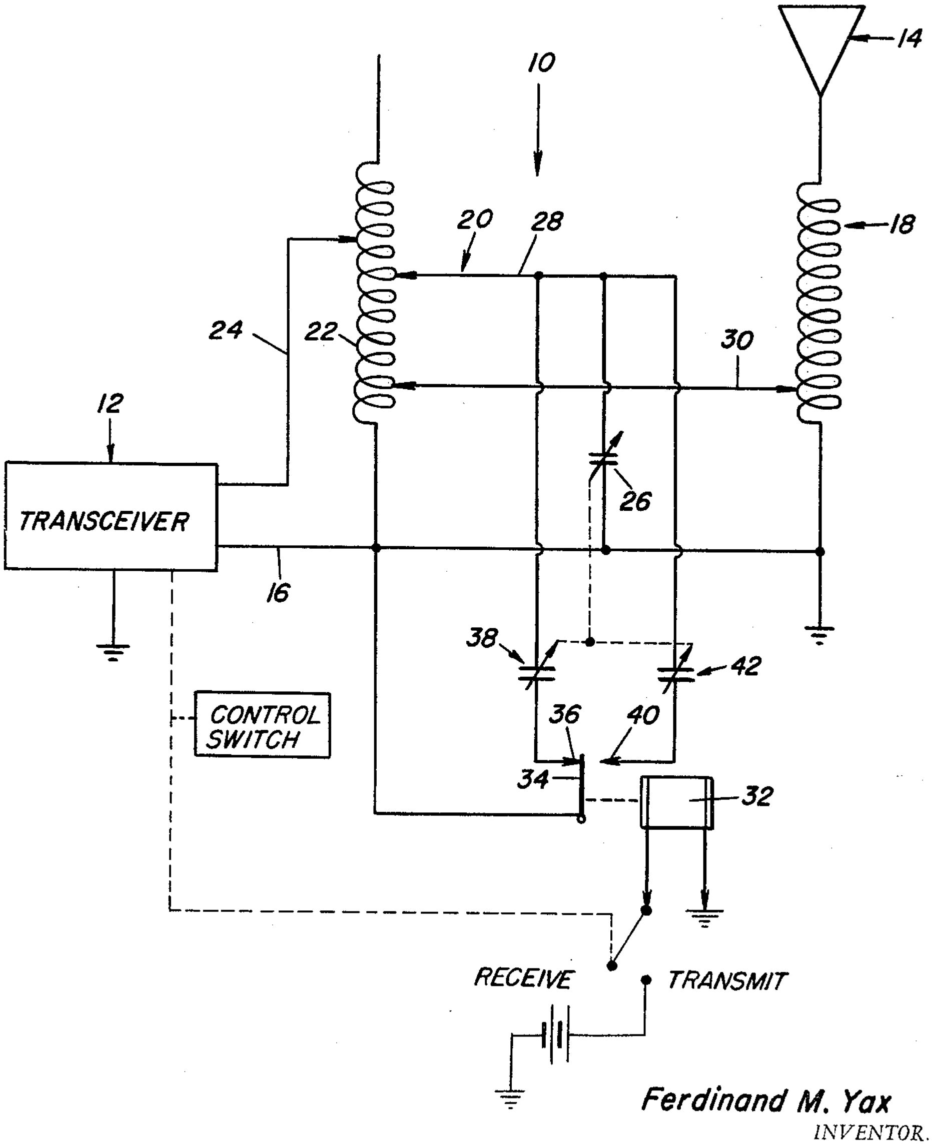
Ferdinand M. Yax
INVENTOR.
BY Clarence A. O'Brien
and Harvey B. Jacobson
Attorneys

United States Patent Office 3,162,809

Patented Dec. 22, 1964

3,162,809

ANTENNA TUNER CIRCUIT FOR RADIO TRANSCEIVER

Ferdinand M. Yax, % Frenchy Radio Mfg. Co., 164 W. Parker St., Scranton, Pa.

Filed July 25, 1962, Ser. No. 212,371
8 Claims. (Cl. 325—25)

This invention relates to a tuning circuit associated with antennas adapted to both receive and transmit radiant energy.

The antenna tuning circuit of the present invention is adapted to be associated with combined transmitting and receiving systems or transceivers for the purpose of obtaining maximum efficiency in both the transmission and reception of radio frequency signals.

It is well known that the tuned setting of inductance and capacitance in connection with a particular radio signal frequency, will differ depending upon transmitting or receiving operation. Accordingly, in connection with any given radio frequency, the nominal setting of a capacitor tuning dial must be modified in order to obtain optimum signal transmitting operation or signal receiving operation. It is therefore the primary object of the present invention, to provide an equalizing arrangement in an antenna tuning circuit which would automatically introduce into the tuning circuit, matched impedances in the form of trimmer capacitors for automatically insuring optimum operation of the transmitting and receiving systems for a given nominal frequency setting of the capacitor tuning dial. The equalizing or trimmer capacitors are therefore operative to so modify the nominal resonant circuit established by the capacitor tuning setting, as to establish a high circuit Q for harmonic suppression in connection with transmitter operations while in connection with receiver operations, a reduction in the variation in step-up ratio is obtained for more efficient receiving operation at the various radio frequency settings.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Referring now to the drawing, the antenna tuning cirsuit of the present invention generally referred to by reference numeral 10 is shown in diagrammatic association with a transmitting and receiving system generally referred to by reference numeral 12 through which conversion occurs between radiant and guided energy in order to render an antenna device 14 operative to both transmit and receive radiant energy at radio frequencies. The receiving components of the transceiver system 12 are therefore operatively connected by the conductor 16 to the grounded inductive coupling device 18 to which the antenna 14 is connected. Also, connected to the conductor 16, is a selectively adjustable resonant circuit generally referred to by reference numeral 20 which includes the tuning inductor 22 to which the transceiver system 12 is connected by the conductor 24 for transmitting operation. The tuning inductor 22 is therefore connected across conductors 16 and 24 and is also connected in parallel to a main tuning capacitor 26 by means of the conductor 28 so as to establish a resonant circuit through which guided energy is conducted to or from the antenna 14. Also conductively interconnecting the inductive coupling device 18 and the tuning inductor 22, is the adjustable connecting conductor 30 by means of which the relative inductances may be adjusted. Accordingly, the main tuning capacitor 26 at a particular setting, will be set at a nominal capacitance value corresponding to a given radio frequency with respect to which the transceiver 12 may either transmit or receive.

When the transceiver 12 is in a receiving condition, the relay device 32 may be deenergized in any suitable manner so that the relay switch 34 will be in contact with the contact 36 thereby connecting the trimmer capacitor 38 in parallel relation to the resonant circuit 20 or in parallel to the main tuning capacitor 26. The trimmer capacitor 38 is impedance matched, so as to modify the resonant circuit characteristic during receiving operation for optimum signal reception purposes. Accordingly, the tuning capacitance values of the capacitor 38 may be more accurately adjusted in accordance with the principles of the present invention so as to reduce variation in step-up ratio between the voltages induced in the antenna 14 and the output voltage across the conductors 16 and 24 on to the transceiver side of the resonant circuit 20. In this manner the relative inductance and capacitance values of the tuning circuit may be set for optimum receiving operation.

It will be appreciated however, that when the transceiver is in a transmitting condition, the same relative settings of inductance and capacitance for receiving operation would not produce optimum transmitting operation. The manner in which the relay 32 is energized and deenergized in accordance with the transmit or receive condition of the transceiver 12, forms no part of the present invention. One obvious way contemplated for controlling the energization of the relay 34 therefore is to ground one of its terminals and connect the other terminal to a source of energizing voltage through a switch ganged with the control switch for the transceiver by means of which the transceiver is manually switched between the transmit and receive conditions. Accordingly, under transmitting conditions, the relay device 32 will be energized so as to close the relay switch 34 on contact 40 whereupon the trimmer capacitor 42 is then connected in parallel with the main tuning capacitor 26 replacing the trimmer capacitor 38. The trimmer capacitor 42 may therefore be operative in conjunction with the tuning of the resonant circuit to establish a high circuit Q with respect to the antenna side of the resonant circuit 20 for the purpose of suppressing interfering harmonics in order to render the transceiver most efficient for transmitting operation. It will therefore be further appreciated, that the nominal capacitance values associated with each radio frequency to which the capacitor 26 is tuned, will be selected in accordance with the simultaneously adjusted capacitance values of the capacitors 38 and 42 necessary to establish optimum operating conditions with respect to either transmitting or receiving operation. The foregoing is made possible because the tank circuit 20 formed by parallel connected inductor 22 and tuning capacitor 26, is varied in impedance with respect to both the transceiver side and antenna side by a change in the parallel connected capacitive reactance provided by switching between the adjustable trimmer capacitors 38 and 42. It will therefore be observed that the trimmer capacitors are connected in parallel with the tuning capacitor between ground line 16 and one of the parallel branches to which the antenna side is connected by line 30 including a portion of the inductive winding of inductor 22. The trimmer capacitors are also connected in parallel with a series branch portion of the inductive winding of inductor 22 connected between the ground line 16 and the line 24 on the transceiver side of the tank circuit. Thus, with respect to the antenna side one of the trimmer capacitors will be in series relation to one portion of inductor 22 extending between lines 28 and 30 while with respect to the transceiver side it will be in parallel relation to another portion between lines 16 and 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a combined transmitting and receiving system, a frequency tuning device for an antenna adapted to transmit and receive radiant energy comprising, selectively adjustable resonant circuit means operatively connected to said transmitting and receiving system in either a transmitting or receiving condition thereof, inductive coupling means operatively connecting said antenna to the resonant circuit means for converting radiant energy to and from guided energy, first adjustable means responsive to the transmitting condition of the combined transmitting and receiving system for introducing a matched impedance to the resonant circuit means to establish therewith a high circuit Q suppressing interfering harmonics when radiating energy is conducted to the antenna by the inductive coupling means and second adjustable means for replacing said matched impedance by another impedance to reduce variation in step-up ratio between the voltage induced in the antenna and the output voltage of the resonant circuit means with change in tuning frequency during the receiving condition.

2. The combination of claim 1, wherein said resonant circuit means includes an adjustable tuning capacitor connected in parallel with a tuning inductor and in series with said inductive coupling means.

3. The combination of claim 2 wherein both of said condition responsive means include trimmer capacitors, and relay-operated switch means for alternatively connecting said trimmer capacitors in parallel with said resonant circuit means.

4. The combination of claim 1 wherein both of said condition responsive means include trimmer capacitors, and relay-operated switch means for alternatively connecting said trimmer capacitors in parallel with said resonant circuit means.

5. In combination with a combined transmitting and receiving system, a frequency tuning device for an antenna adapted to transmit and receive radiant energy comprising, selectively operable tuning means for establishing a nominal impedance for operation of the combined transmitting and receiving system at a resonant frequency, and capacitor means rendered operative in response to said operation for changing the nominal impedance of the tuning means in accordance with the transmitting or receiving condition of the system.

6. The combination of claim 5, wherein said capacitor means comprises a pair of trimmer capacitors selectively connected in parallel with a tuning capacitor of said tuning means having a nominal capacitance value with respect to the resonant frequency to which the system is tuned.

7. In combination with a parallel resonant circuit alternately loaded by a transmitting and receiving apparatus and an antenna device, capacitive tuning means for establishing different impedances with respect to the apparatus and the device which lie between values providing a high circuit Q for transmitting operation and a minimum variation in step-up ratio during tuning of the resonant circuit, a first trimmer capacitor establishing an impedance value for the resonant circuit when connected in parallel with the capacitive tuning means providing said high circuit Q when the resonant circuit is loaded by the antenna device during transmitting operation, a second trimmer capacitor establishing an impedance value for the resonant circuit when connected in parallel with the capacitive tuning means providing said minimum variation in the step-up ratio during tuning of the resonant circuit when loaded by the apparatus during receiving operation and means alternatively connecting said first and second trimmer capacitors in parallel with the capacitive tuning means for transmitting or receiving operation of the transmitting and receiving apparatus.

8. In combination with a parallel resonant circuit including an inductor having different portions respectively connected to a signal converting device, an antenna device and a tuning capacitor, means for modifying the impedance established for the resonant circuit by the tuning capacitor comprising, a pair of trimmer capacitors, means alternatively connecting said trimmer capacitors to the inductor in parallel with the tuning capacitor, and means for adjusting the capacitance of each of said capacitors to receive or transmit radiant energy through the antenna device at a plurality of different frequencies, the capacitance of the tuning capacitor for the different frequencies lying between values at which the impedance of the resonant circuit is suitable for either receiving or transmitting operation and said trimmer capacitors respectively establishing equivalent capacitance values with the tuning capacitor for optimum receiving or transmitting operation of the resonant circuit at said different frequencies.

References Cited in the file of this patent

UNITED STATES PATENTS

| | | |
|---|---|---|
| 1,649,131 | Schwarz | Nov. 15, 1927 |
| 2,018,569 | Pettingill et al. | Oct. 22, 1935 |
| 2,810,070 | Yates | Oct. 15, 1957 |

FOREIGN PATENTS

| | | |
|---|---|---|
| 550,774 | Great Britain | Jan. 25, 1943 |